United States Patent [19]
Chu

[11] Patent Number: 5,615,746
[45] Date of Patent: Apr. 1, 1997

[54] REINFORCED PNEUMATIC TOOL HOLDER

[76] Inventor: George Chu, c/o Hung Hsing Patent Service Center, P.O. Box 55-1670, Taipei, Taiwan

[21] Appl. No.: 594,664

[22] Filed: Feb. 2, 1996

[51] Int. Cl.⁶ .................................................. B26B 27/00
[52] U.S. Cl. .......................... 173/171; 30/272.1; 30/339; 30/392; 403/229; 403/179; 403/404
[58] Field of Search ............................ 30/339, 392–394, 30/272.1; 83/699.21; 279/158; 264/242, 273, 261, 262; 29/898.048, 898.049; 403/299, 306, 307, 229, 179, 404, 343; 173/171

[56] References Cited

U.S. PATENT DOCUMENTS

| | | | |
|---|---|---|---|
| 2,247,928 | 7/1941 | Temple, Jr. | 403/307 X |
| 2,976,093 | 3/1961 | Reiling | 264/273 X |
| 3,001,900 | 9/1961 | Frieder et al. | 264/273 X |
| 3,407,251 | 10/1968 | Elliott et al. | 264/242 X |
| 3,983,205 | 9/1976 | Barrett | 264/254 X |
| 4,864,727 | 9/1989 | Chu | 30/272.1 X |
| 5,152,948 | 10/1992 | Lizenby | 264/242 X |

*Primary Examiner*—Rinaldi I. Rada
*Assistant Examiner*—Boyer Ashley

[57] ABSTRACT

A reinforced pneumatic tool holder includes: a handle having a sliding sleeve secured in a front portion of the handle, and a tool clamping device generally formed with an elastomer block for clamping a pneumatic tool such as a saw blade or a file on the tool clamping device reciprocatively held in the sliding sleeve of the handle for manipulating the pneumatic tool, with a reinforcing member integrally formed in an elastomer block for reinforcing the tool clamping device for firmly fixing the tool and a piston rod in the elastomer block for absorbing shock, preventing loosening and for sustaining a great working pressure of the tool, and also for preventing injury to a worker when operating the tool.

3 Claims, 5 Drawing Sheets

5,615,746

REINFORCED PNEUMATIC TOOL HOLDER

BACKGROUND OF THE INVENTION

U.S. Pat. No. 4,864,727 entitled "Pneumatic Tool Holder" also issued to the same inventor of this application disclosed a pneumatic tool holder including a tool clamping means (3) having a block (30) made of elastomer materials reciprocatively held in a sleeve secured to a handle (1) for clamping a pneumatic tool in a socket formed in the elastomer block (30) for absorbing shock for occupational health and safety.

The elastomer block 30 is simply formed with plastic material, without embedding any reinforcing members in the elastomer block 30. Upon a long time operation of the tool holder under serious vibration by the reciprocative pneumatic tool, the block 30 made of plastic material will be easily deformed, or broken to interrupt a pneumatic work or may possibly cause injury accidents to the worker.

The present inventor has found the drawbacks of the conventional pneumatic tool holder and invented the present pneumatic tool holder having reinforcing member embodied in the elastomer block.

SUMMARY OF THE INVENTION

The object of the present invention is to provide a reinforced pneumatic tool holder including: a handle having a sliding sleeve secured in a front portion of the handle, and a tool clamping device generally formed with an elastomer block for clamping a pneumatic tool such as a saw blade or a file on the tool clamping device reciprocatively held in the sliding sleeve of the handle for manipulating the pneumatic tool, with a reinforcing member integrally formed in the elastomer block for reinforcing the tool clamping device for absorbing shock, preventing loosening of the tool elements, and for sustaining a great working pressure, as well as for preventing injury to a worker when operating the pneumatic tool.

DETAILED DESCRIPTION

Figure 1:
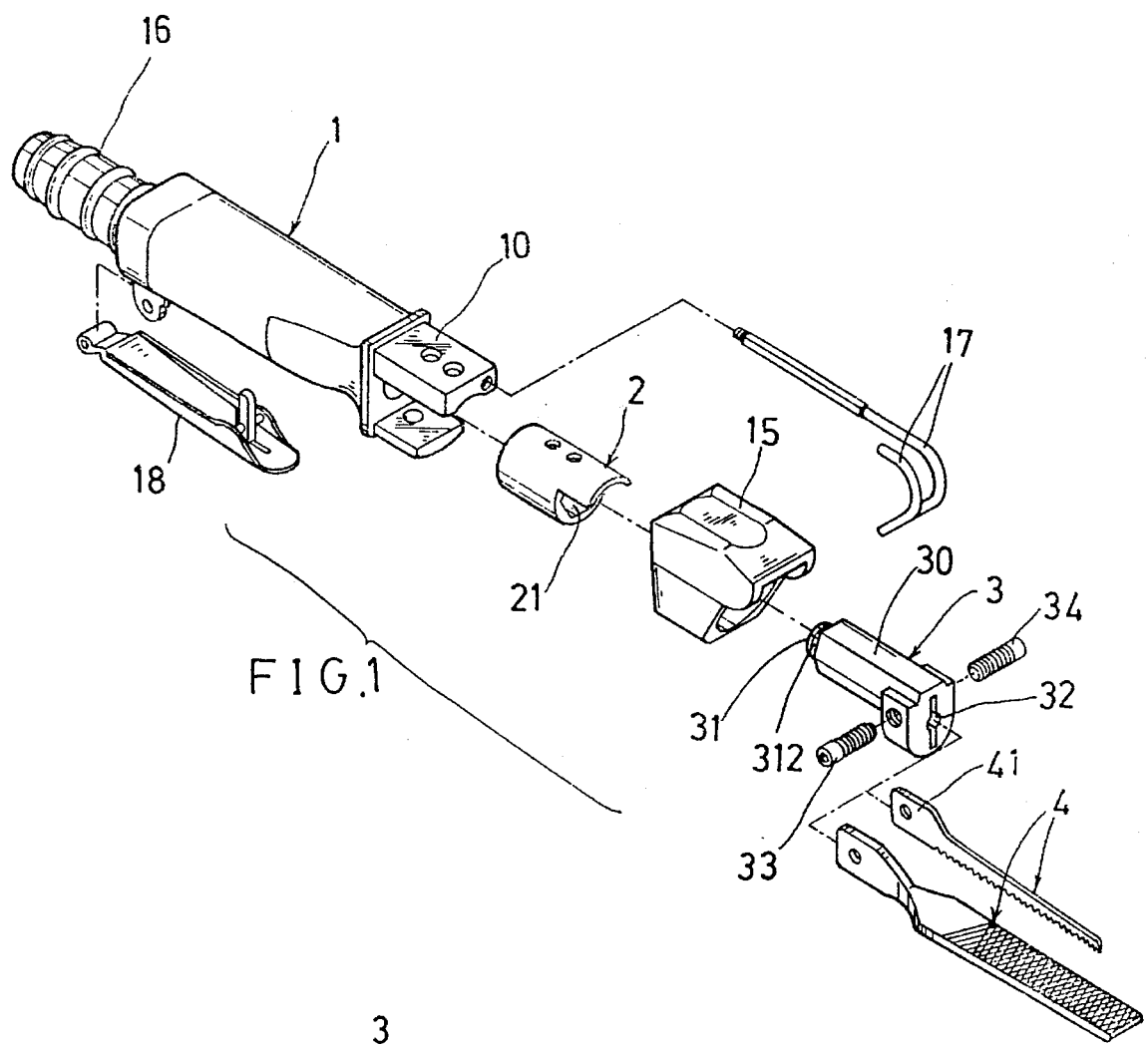
FIG. 1 is an exploded perspective view showing the parts in construction of the present invention.
Figure 2:
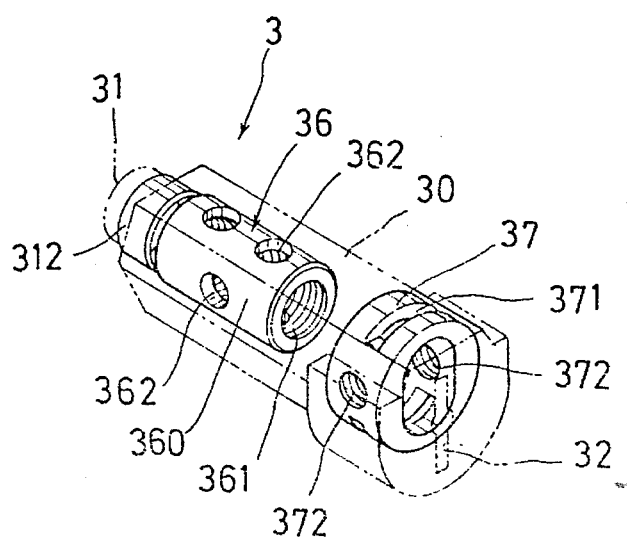
FIG. 2 is an illustration showing the tool clamping device of the present invention.
Figure 3:
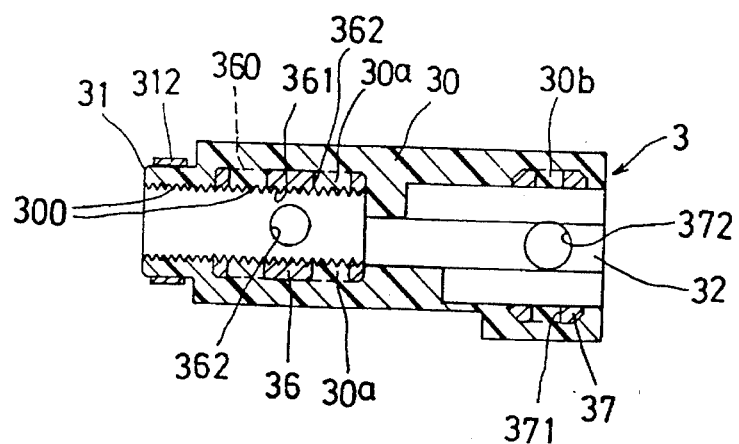
FIG. 3 is a sectional drawing of the tool clamping device of the present invention.
Figure 4:
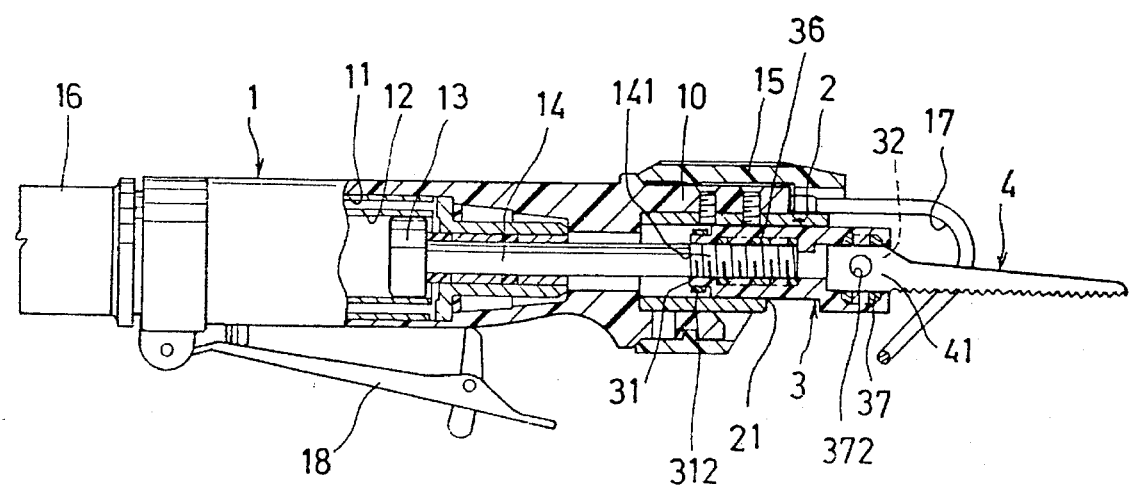
FIG. 4 is a partial sectional drawing of a pneumatic tool set in accordance with the present invention.

As shown in FIGS. 1–4, a reinforced pneumatic tool holder of the present invention comprises: a handle 1 having a sliding sleeve 2 secured in a bracket 10 formed at a front portion of the handle 1, and a tool clamping device 3 reciprocatively held in a longitudinal hole 21 formed through the sliding sleeve for firmly holding a pneumatic tool 4 such as a saw blade, a file or other pneumatic tools on the tool clamping device 3 for preventing rotation, twisting or loosening of the tool on the clamping device 3.

The handle 1 and the sleeve 2 for the pneumatic tool holder of this invention are generally similar to that of the tool holder as shown in U.S. Pat. No. 4,864,727 also invented by the same inventor of this application.

The handle 1 includes: a cylindrical bore 11 for inserting a pneumatic cylinder 12 in the bore 11 for reciprocatively holding a piston 13 in the pneumatic cylinder 12, a piston rod 14 having a rear rod end secured with the piston 13 and having a front rod end formed as a male-threaded portion 141 to be engageable with a female-threaded hole formed in the tool clamping device 3, a protective cover 15 secured on the bracket 10 formed on the front portion of the handle 1, a safety holder or guard 17 protruding forwardly from the bracket 10, a lever 18 for actuating the air source, and a hose connector 16 formed on a rear end of the handle 1 to be connected with an air hose for directing air into the pneumatic cylinder 12 for driving the piston 13, the tool clamping device 3 and the tool 4 for operating a pneumatic tool. The tool 4 has its root portion 41 inserted in the clamping device 3.

The tool clamping device 3 includes: an elastomer block 30 made of elastomer materials such as plastic materials with good wear resistance and rigidity by molding process, a cross-linking reinforcing member 36 made of rigid materials such as aluminum alloy or other materials having good mechanical strength and integrally formed in a central portion of the elastomer block 30 having a sleeve portion 360 provided with a female-threaded sleeve hole 361 longitudinally formed through the sleeve portion 360 of the cross-linking reinforcing member 36 for engaging the male-threaded portion 141 of the piston rod 14 with the female-threaded sleeve hole 361, a plurality of slots or openings 362 formed through a thickness of the sleeve portion 360 each slot 362 communicated with the female-threaded sleeve hole 361 and each slot 362 filled with a grafting protrusion 30a into each transverse slot 362 perpendicularly when integrally molding the reinforcing member 36 in the elastomer block 30 for forming a cross-linking structure by incorporating the elastomer material into the slots 362 for firmly binding the sleeve portion 360 with the elastomer block 30 for preventing shrinkage, cleavage, breakage or deformation after molding process for reinforcing the reinforcing member 36 in the elastomer block 30, a female-threaded hole 300 formed in the elastomer block 30 matching with the female-threaded sleeve hole 361 formed in the sleeve portion 360 of the cross-linking reinforcing member 36 for engaging the male-threaded portion 141 of the piston rod 14 in the female-threaded hole 361, a rear stem 31 protruding rearwardly having a rear fastening ring 312 which may be made of metallic ring for fastening the rear stem 31 and the piston rod 14 secured therein, a cross-linking collar 37 integrally formed with a front portion of the elastomer block 30 for fastening the root portion 41 of the tool 4 inserted in a tool socket 32 recessed in a front portion of the elastomer block 30 and a pair of set screws 33, 34 for clamping the tool 4 in the socket 32 (FIG. 1) by passing the screws 33, 34 through a pair of screw holes 372 respectively formed in two opposite side portions in the cross-linking collar 37, and at least two transverse collar slots 371 formed through the cross-linking collar 37 for filling a front grafting protrusion 30b into each transverse collar slot 371 when integrally molding the crosslinking collar 37 in the elastomer block 30 for firmly binding the collar 37 with the elastomer block 30 for forming a crosslinking configuration by the elastomer block 30 and the collar grafting protrusions 30b for greatly enhancing the mechanical strength of the elastomer block 30 and the tool clamping means 3. The tool and the piston rod will be firmly fixed in the reinforced elastomer block 30 for absorbing shock, preventing loosening and for sustaining a large working pressure when operating the tool.

The elastomer block 30 is reinforced by the cross-linking reinforcing member 36 including a cross-linking collar 37 to enhance its mechanical strength, to prevent its breakage and to prolong the service life of the tool holder by overcoming the aging or deterioration of the elastomer material, thereby being superior to the prior art of pneumatic tool holder such as disclosed in U.S. Pat. No. 4,864,727.

Figure 5:
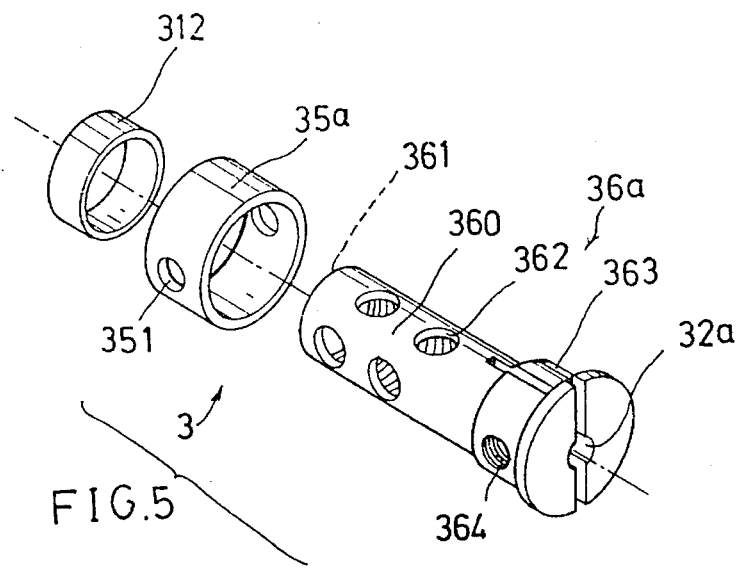
FIG. 5 is a perspective view of another preferred tool clamping means in accordance with the present invention.
Figure 6:
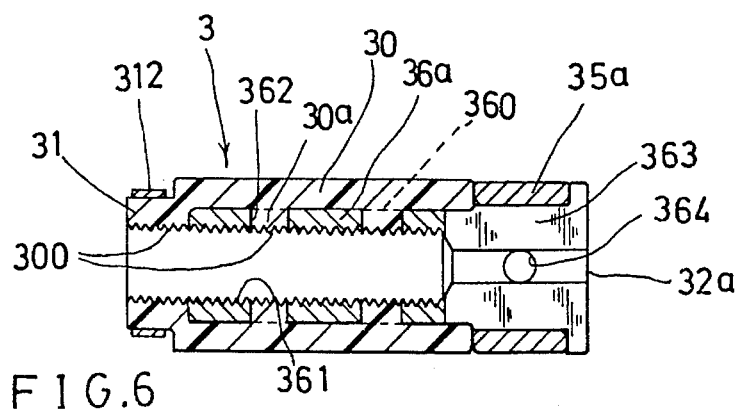
FIG. 6 is a sectional drawing of the tool clamping device of FIG. 5.
Figure 7:
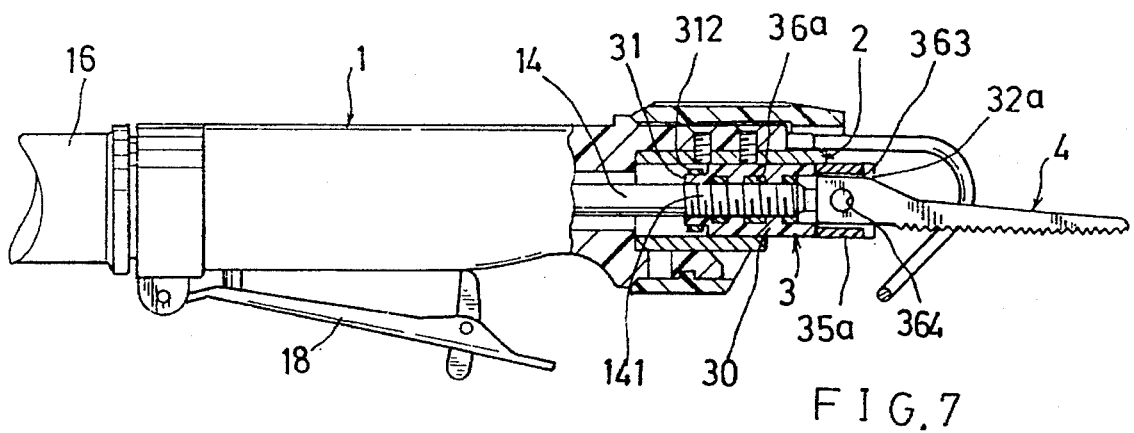
FIG. 7 is a partial sectional drawing of the whole set of pneumatic tool having the tool clamping device as shown in FIG. 5.
Figure 8:
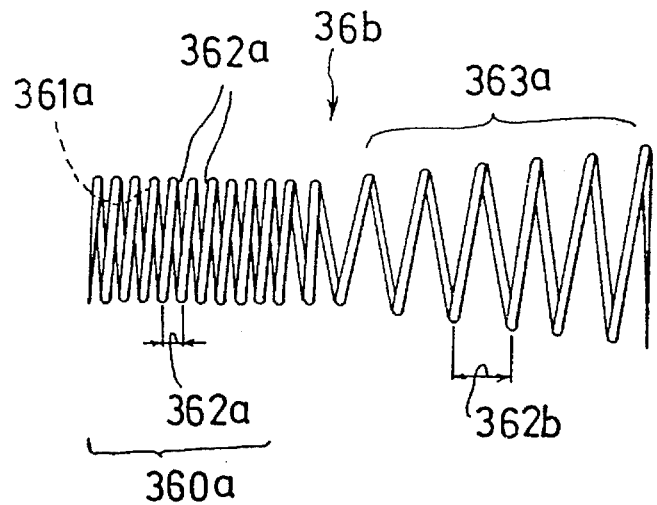
FIG. 8 shows another preferred reinforcing member for use in the tool clamping device in accordance with the present invention.

Another preferred embodiment of the present invention is shown in FIGS. 5–7, which modifies the tool clamping device 3 to have the cross-linking reinforcing member 36a integrally formed in the elastomer block 30 having a rear stem 31 fastened with a rear fastening ring 312 on the rear stem 31, with the cross-linking reinforcing member 36a including: a sleeve portion 360 having a plurality of slots 362 formed through the thickness of the sleeve portion 360 each slot 362 perpendiculary communicated with a female-threaded sleeve hole 361 longitudinally formed in the sleeve portion 360 and each slot 362 filled with a grafting protrusion 30a into the transverse slot 362 when integrally molding the reinforcing member 36a in the elastomer block 30, a female-threaded hole 300 formed in the elastomer block 30 to match the female-threaded sleeve hole 361 formed in the sleeve portion 360 for engaging a male-threaded portion 141 of the piston rod 14, an enlarged head portion 363 connected to the sleeve portion 360 and having a socket 32a recessed in a front end portion of the enlarged head portion 363 for inserting a tool 4 in the socket 32a with a pair of screw holes 364 respectively formed in two opposite side portions of the enlarged head portion 363 for inserting a pair of set screws into the screw holes 364 for clamping the tool 4 in the socket 32a, with the pair of set screws passing through a pair of outer screw holes 351 formed in a fastening collar 35a further fastening the enlarged head portion 363.

The unique reinforcing member 36a as shown in FIGS. 5–7 may be considered as a combination of the sleeve portion 360 and the cross-linking collar 37 as shown in FIGS. 1–4.

Figure 9:
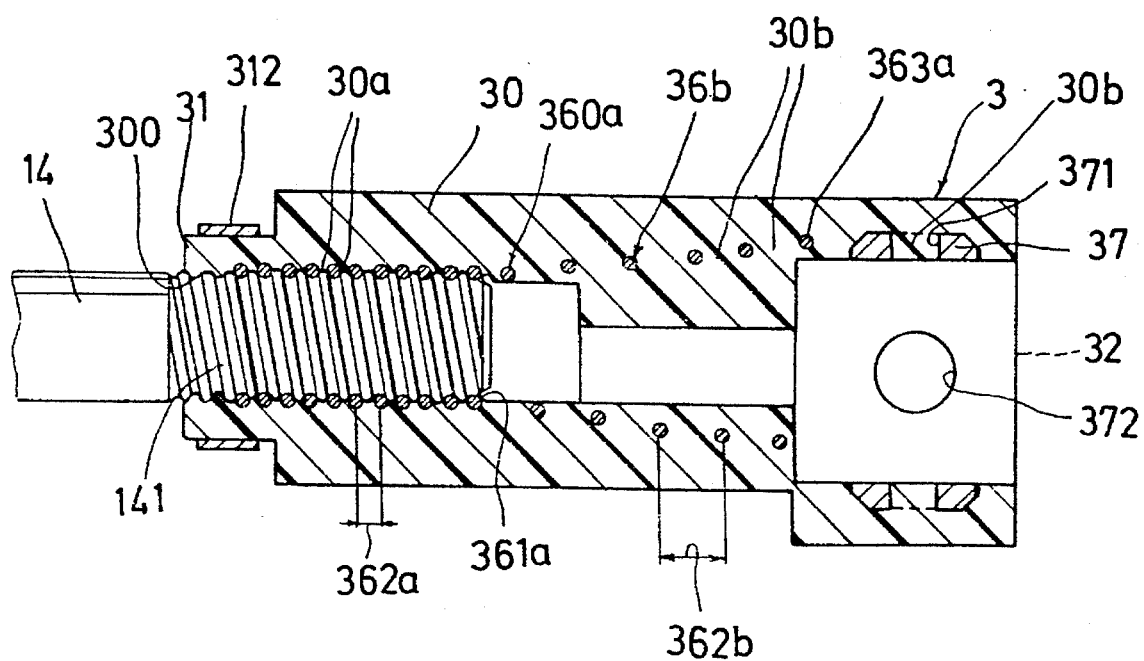
FIG. 9 is a sectional drawing of the tool clamping device including the reinforcing member as shown in FIG. 8.
Figure 10:
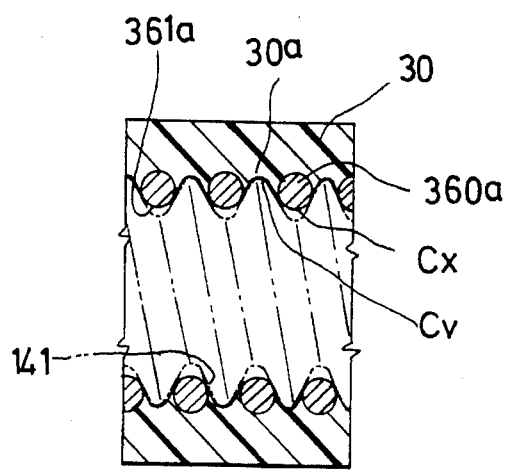
FIG. 10 is a partial sectional drawing of the tool clamping device as enlarged from FIG. 9.
Figure 11:
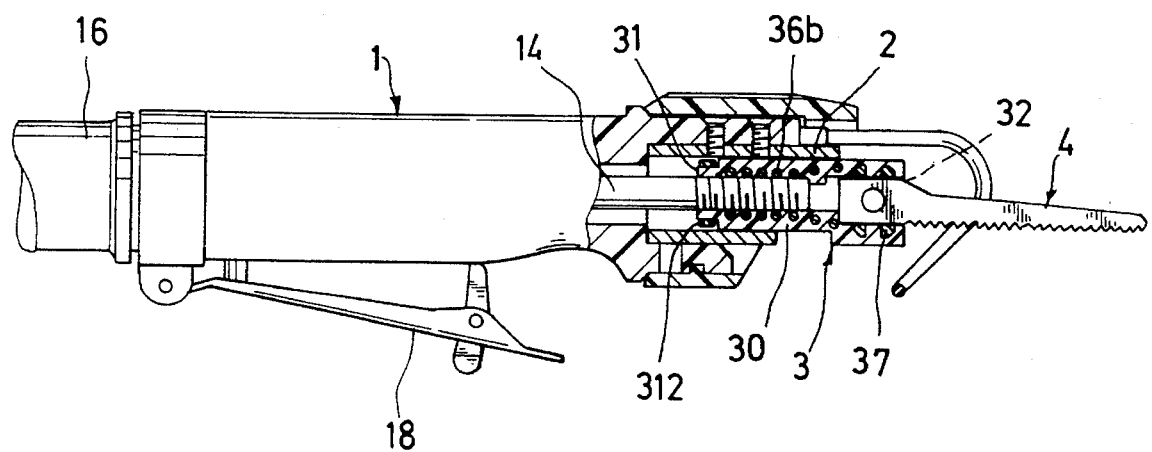
FIG. 11 is a partial sectional drawing of the whole set of pneumatic tool having the tool clamping device as shown in FIGS. 8 and 9.

Still another preferred embodiment of the present invention is shown in FIGS. 8–11, which modifies the tool clamping device 3 to have the cross-linking reinforcing member 36b integrally formed in the elastomer block 30, with the cross-linking reinforcing member 36b including a cylindrical helical spring 360a integrally formed in a rear portion of the elastomer block 30, a pitch 362a defined between every two neighbor spring "rings" or turns filled with a grafting protrusion 30a into each pitch 362a for forming a cross-linking structure when integrally molding the reinforcing member 36b in the elastomer block 30 as shown in FIGS. 9, 10 for firmly binding the cylindrical helical spring 360a with the elastomer block 30 for preventing breakage of the tool clamping device 3, with each grafting protrusion 30a in each pitch 362a between every two neighbor spring rings forming a concave portion Cv and each spring ring formed as a convex portion Cx adjacent to each concave portion Cv as shown in FIG. 10 to form a female-threaded spring hole 361a by continuously alternating each concave portion Cv of the grafting protrusion 30a and each convex portion Cx of the spring ring of the cylindrical helical spring 360a, a female-threaded hole 300 formed in the elastomer block 30 to match with the female-threaded spring hole 361a for engaging the male-threaded portion 141 of the piston rod 14 therein, a conical helical spring 363a formed in a front portion of the elastomer block 30, a front pitch 362b between every two neighbor spring rings or turns filled with a front grafting protrusion 30b when integrally molding the reinforcing member 36b in the elastomer block 30 for firmly binding the conical helical spring 363a in the front portion of the elastomer block 30, a cross-linking collar 37 integrally formed with a front end portion of the elastomer block 30 for fastening the tool 4 inserted in a socket 32 recessed in a front end portion of the elastomer block 30 having a pair of set screws inserted in two screw holes 372 formed in the collar 37, and at least two transverse collar slots 371 formed through the collar 37 for filling a front grafting protrusion 30b into each transverse collar slot 371 when integrally molding the crosslinking collar 37 in the elastomer block 30.

In accordance with the present invention, a reinforcing member 36, 36a, 36b can be firmly embodied in the elastomer block 30 to greatly increase the mechanical strength of the tool clamping device 3 for prolonging its service life without affecting the shock-absorbing property as effect by the elastomer block 30 to be improved over the U.S. Pat. No. 4,864,727 as aforementioned.

The present invention may be modified without departing from the spirit and scope of this invention.

I claim:

1. A pneumatic tool holder comprising:

a handle having a tool clamping device reciprocatively held in a front portion of said handle, a tool clamped in said tool clamping device, a piston reciprocated in a pneumatic cylinder in said handle and a piston rod connected to said tool clamping device for driving said tool clamping device for operating said tool;

said tool clamping device including: a cross-linking reinforcing member made of rigid materials and integrally formed with an elastomer block made of elastomer materials, said cross-linking reinforcing member having a sleeve portion formed with a female-threaded sleeve hole longitudinally formed through the sleeve portion of the cross-linking reinforcing member for engaging a male-threaded portion of the piston rod with the female-threaded sleeve hole, said sleeve portion having a plurality of slots formed through a thickness of the sleeve portion each said slot perpendicularly communicated with the female-threaded sleeve hole and each said slot filled with a grafting protrusion therein when integrally molding the reinforcing member in the elastomer block for binding the sleeve portion with the elastomer block, a female-threaded hole formed in the elastomer block matching with the female-threaded sleeve hole formed in the sleeve portion of the cross-linking reinforcing member for engaging the male-threaded portion of the piston rod in the female-threaded hole, a rear stem protruding rearwardly having a rear fastening ring fastening the rear stem and the piston rod secured therein, a cross-linking collar integrally formed with a front portion of the elastomer block for fastening a root portion of the tool inserted in a tool socket recessed in a front portion of the elastomer block, and at least two transverse collar slots formed through the cross-linking collar for filling a front grafting protrusion into each said transverse collar slot when integrally molding the cross-linking collar in the elastomer block for binding the collar with the elastomer block.

2. A pneumatic tool holder comprising:

a handle having a tool clamping device reciprocatively held in a front portion of said handle, a tool clamped in said tool clamping device, a piston reciprocated in a pneumatic cylinder in said handle and a piston rod connected to said tool clamping device for driving said tool clamping device for operating said tool;

said tool clamping device including: a cross-linking reinforcing member integrally formed in an elastomer block having a rear stem fastened with a rear fastening ring on the rear stem, said cross-linking reinforcing member including: a sleeve portion having a plurality of slots formed through a thickness of the sleeve portion, each said slot perpendicularly communicated with a female-threaded sleeve hole longitudinally formed in the sleeve portion and each said slot filled with a grafting protrusion therein when integrally molding the reinforcing member in the elastomer block, a female-threaded hole formed in the elastomer block to match the female-threaded sleeve hole formed in the sleeve portion for engaging a male-threaded portion of the piston rod, an enlarged head portion connected to the sleeve portion and having a socket recessed in a front end portion of the enlarged head portion for inserting a tool in the socket with a pair of screw holes respectively formed in two opposite side portions of the enlarged head portion for inserting a pair of set screws into the screw holes for clamping the tool in the socket, with the pair of set screws passing through a pair of outer screw holes formed in a fastening collar fastening the enlarged head portion.

3. A pneumatic tool holder comprising:

a handle having a tool clamping device reciprocatively held in a front portion of said handle, a tool clamped in said tool clamping device, a piston reciprocated in a pneumatic cylinder in said handle and a piston rod connected to said tool clamping device for driving said tool clamping device for operating said tool;

said tool clamping device including a cross-linking reinforcing member integrally formed in the elastomer block, said cross-linking reinforcing member including a cylindrical helical spring integrally formed in a rear portion of the elastomer block, a pitch defined between every two neighbor spring rings and filled with a grafting protrusion into each said pitch when integrally molding the reinforcing member in the elastomer block for binding the cylindrical helical spring with the elastomer block, each said grafting protrusion in each said pitch between every two neighbor spring rings forming a concave portion (Cv) and each said spring ring formed as a convex portion (Cx) adjacent to each said concave portion (Cv) to form a female-threaded spring hole by continuously alternating each said concave portion (Cv) of the grafting protrusion and each said convex portion (Cx) of the spring ring of the cylindrical helical spring, a female-threaded hole formed in the elastomer block to match with the female-threaded spring hole for engaging a male-threaded portion of the piston rod therein, a conical helical spring formed in a front portion of the elastomer block, a front pitch between every two neighbor spring rings filled with a front grafting protrusion in each said front pitch when integrally molding the reinforcing member in the elastomer block for binding the conical helical spring in the front portion of the elastomer block, a cross-linking collar integrally formed with a front end portion of the elastomer block for fastening the tool inserted in a socket recessed in a front portion of the elastomer block, and at least two transverse collar slots formed through the cross-linking collar for filling a front grafting protrusion into each said transverse collar slot when integrally molding the cross-linking collar in the elastomer block.

* * * * *